United States Patent [19]
Bykhovsky et al.

[11] 3,930,139
[45] Dec. 30, 1975

[54] NONCONSUMABLE ELECTRODE FOR OXYGEN ARC WORKING

[76] Inventors: David Grigorievich Bykhovsky, Konjushenny pereulok, 1, kv. 18; Alexandr Yakovlevich Medvedev, ulitsa Kalyaeva 3, kv. 17; Yakov Vulfovich Rossomakho, prospekt Nauki 14/1, kv. 231, all of Leningrad; Margarita Nikolaevna Butova, ulitsa Shabolovka 63/1, kv. 58, Moscow, all of U.S.S.R.

[22] Filed: May 28, 1974

[21] Appl. No.: 474,076

[52] U.S. Cl. .............. 219/145; 219/75; 219/121 P; 313/346 R
[51] Int. Cl.² .................. B23K 35/04; B23K 9/26
[58] Field of Search .................. 219/75, 121 P, 145; 313/346 R

[56] References Cited
UNITED STATES PATENTS

| | | | |
|---|---|---|---|
| 3,214,623 | 10/1965 | Sheer | 219/75 X |
| 3,361,596 | 1/1968 | Senderoff et al. | 313/346 R X |
| 3,408,528 | 10/1968 | Devime et al. | 219/145 X |
| 3,428,834 | 2/1969 | Yerouchalmi | 313/346 R X |
| 3,476,971 | 11/1969 | Ligenza et al. | 313/346 R X |
| 3,546,422 | 12/1970 | Bykhovsky et al. | 219/121 P |
| 3,590,242 | 6/1971 | Glascock | 313/346 R X |
| 3,597,649 | 8/1971 | Bykhovsky et al. | 219/145 X |
| 3,758,746 | 9/1973 | Bykhovsky et al. | 219/145 |
| 3,777,209 | 12/1973 | McDonie et al. | 313/346 R X |

*Primary Examiner*—J. V. Truhe
*Assistant Examiner*—N. D. Herkamp
*Attorney, Agent, or Firm*—Holman & Stern

[57] ABSTRACT

A nonconsumable electrode for oxygen arc working, comprising a holder produced from copper or alloys thereof and an active insert fastened to the end face of the holder and which is in thermal and electrical contact with said holder through a metal distance piece disposed between the active insert and the holder and over their entire contact surface area, the metal distance piece being manufactured from aluminium or alloys thereof and the active insert being from hafnium or from hafnium with yttrium and neodymium oxides as dopants therein taken either separately or in combination.

4 Claims, 2 Drawing Figures

NONCONSUMABLE ELECTRODE FOR OXYGEN ARC WORKING

BACKGROUND OF THE INVENTION

The present invention relates to electric arc and plasma arc working of materials and more particularly to nonconsumable electrodes for arc working.

The present nonconsumable electrode for oxy arc working may prove to be most advantageous for plasma arc metal cuttings, for surface fusing, e.g. for removing external defects from ingots, blanks, rolled products and castings. Moreover, the present invention is equally well suited for heating oxygen in various metallurgical and plasma-chemical processes, with the material to be treated being atmosphere oxygen.

A nonconsumable electrode for plasma arc working in active media is known in the art, which comprises a holder made from a material featuring high thermal conductivity, and a zirconium active insert bonded metallurgically to the holder (see, e.g. U.S. Pat. No. 3,198,932, Cl. 219-145).

Also known is a nonconsumable electrode for plasma arc working in active media made from an electrode holder manufactured from copper, or alloys thereof, an active zirconium insert, and a distance piece made from metals chosen from the group of metals consisting of V, Nb, Ta, Cr, Mo, and W, which is inert to both zirconium and copper (see, e.g. U.S. Pat. No. 3,546,422, Cl. 219-121). The above electrodes have found application in machines for plasma arc cutting in air. However, when plasma arc cutting is performed in oxygen by using intermittent cycles, which are most peculiar to the cutting process, the service life of such an electrode is inadequate with respect to the economic aspects for an industrial operation. The process parameters are as follows:

| | |
|---|---|
| Diameter of zirconium active insert, mm | 2.5 |
| Height of active insert, mm | 4.5 |
| Diameter of copper holder, mm | 16 |
| Arc current, A | 200–300 |
| Nozzle diameter, mm | 4 |
| Consumption of plasma-forming gas (oxygen), nm$^3$/hr. | 4 |
| Arc time when cutting sheet steel, min. | 1 |
| Off-time between two on-times, min. | 0.5. |

In cutting sheet steel with electrodes comprising an active zirconium insert, the holder is bonded, in particular, metallurgically through silver, or separated from it with the aid of an inert tantalum distance piece, with the total number of cuts averaging 30–80.

At the same time an electrode for plasma arc working in active media is known, which comprises a holder manufactured from copper and/or alloys thereof and a hafnium active insert arranged directly within the holder (see, e.g., U.S. Pat. No. 3,597,649, Cl. 313-211).

The service life of such an electrode for the above-described process parameters ranges within 50–100 cuts and although this figure excels the working period of the electrodes having zirconium active inserts, it is still unsuitable for wide industrial use.

SUMMARY OF THE INVENTION

The principal object of the invention is the provision of an electrode useful in plasma machines operating in oxygen and which features a extended service life.

Still another object of the invention is to enhance the functional reliability of the electrode.

Said objects are accomplished by the fact that in a nonconsumable electrode for oxygen arc working comprising a holder manufactured from copper or alloys thereof, and an active insert found to be in thermal and electric contact with the holder through a metal distance piece arranged between the active insert and the holder covering the entire contact surface area, and according to the invention, aluminium or alloys thereof are employed as the metal distance piece and with hafnium or hafnium with such dopants as yttrium oxide or yttrium, and neodymium oxides, being employed as the active insert.

It is expedient that the thickness of the metal distance piece made from aluminium or alloys thereof be selected within 0.01–0.2 mm.

It is preferred that the active insert be produced from hafnium with yttrium oxide as a dopant, with the weight percentage of the components being: hafnium, 94–86; yttrium oxide, 6–14.

Moreover, the active insert is also preferably manufactured from hafnium doped with yttrium and neodymium oxides, with the weight percentage of the components being as follows: hafnium, 93–89; yttrium oxide, 6–9; neodymium oxide, 1–2.

The total service life of the proposed nonconsumable electrode for the above-described process variables amounts to from 250 to 400 cuts which provides reliable use of the proposed nonconsumable electrodes in industrial plants for oxy plasma arc cutting. Of prime importance is the possibility of using the proposed nonconsumable electrodes in plants operating under flow-line conditions.

The invention is further exemplified by a detailed description of an exemplary embodiment, taken in conjunction with the accompanying drawings, wherein.

Figure 1:
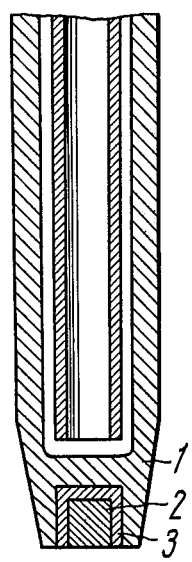
FIG. 1 depicts a sectional view of the nonconsumable electrode, according to the invention.

When operating with a nonconsumable electrode comprising a holder and an active insert, the latter is subject to erosion which results in the formation of a crater, shortening the total service life of the electrode caused by burning through of the active insert throughout its height. Experiments have shown that the nonconsumable electrodes with zirconium inserts operating in oxygen by an intermittent cycle fail to provide the requisite industrial service life. At the initial stage of operation, the oxygen erosion velocity of a nonconsumable electrode with a hafnium insert is about the same order as in air. However, as the erosion depth approaches approximately 1 mm, the insert burns out so rapidly that the entire service life is, for all practical purpose over at the insert burn height of only 1 mm. The rapid burning-out of the nonconsumable electrodes with the hafnium inserts is, in the first place, attributable to the breakdown of the copper holder. With the nonconsumable electrode operating in oxygen, as the erosion of the active insert increases and an arc column immerses into the forming crater, a heat flux grows up and upon reaching a definite value, the copper melts and rapidly oxidizes in the vicinity of the active insert. Owing to the heat liberated during this chemical reaction, still larger volumes are involved in the process. The oxidized melt being formed flows off and into the crater onto the active insert, leading to its contamination and a sharp increase in the erosion velocity. This becomes especially manifest with nonconsumable electrodes operating in oxygen with an intermittent cycle. When an electric arc is struck, there is a high probability that an electrode spot hits the surface of the copper holder near the active insert which will cause melting and vigorous oxidation of the copper leads, as described above, and a substantial increase in the velocity of erosion.

An attempt at separating the hafnium insert and copper holder with an inert spacer of vanadium, niobium, tantalum, chromium, molybdenum and tungsten was not successful, insofar as oxides formed on the above metals, when operating in oxygen, feature high vapour pressure and evaporate rapidly, thereby not being capable of protecting copper from the effect of an arc column.

In this connection we have developed a nonconsumable electrode for oxygen arc working, comprising a holder 1 made from copper or alloys thereof, and an active insert 2 provided in thermal and electric contact with the holder 1 which is effected through a metal spacer 3 arranged between said active insert 2 and holder 1 covering their contact surface area.

The material of the metal spacer 3, is aluminium or alloys thereof, whereas the active insert 2 is produced from hafnium or hafnium with such dopants as yttrium or neodymium oxides taken either separately or in combination.

The employment of the metal spacer 3 of aluminium or its alloys disposed between the hafnium active insert 2 and copper holder 1 provides a full and useful service life of the nonconsumable electrode, when operating in oxygen, along the entire height of the active insert 2, since the aluminum oxide formed on the metal spacer 3 is a high-melting compound having a melting point of 2043°C acting, and thereby acts as a thermal shield protecting the copper holder 1 from both overheating and oxidation.

An extended service life of the nonconsumable electrode achieved by introducing yttrium oxide into the composition of the hafnium active insert 2 is based on the fact that, in the electrodes operating in oxygen yttrium oxide stabilizes hafnium oxides formed on the emitting surface and increases their thermostability. The role of neodymium oxide, as a dopant, consists in that it enhances the electrical conductivity of the hafnium oxide being formed. Improved electrical conductivity reduces heat liberation on the active insert 2 and contributes to a prolonged service life. Quantitative ratios of the proposed dopants have been determined experimentally.

Given hereinbelow are illustrative examples of the embodiment of the nonconsumable electrode.

EXAMPLE 1

A nonconsumable electrode has been tested in a plasma machine during plasma cutting performed under the following conditions:

| | |
|---|---|
| Diameter of active insert, mm | 2.5 |
| Height of active insert, mm | 4.5 |
| Diameter of copper holder, mm | 16 |
| Arc current, A | 200 |
| Nozzle diameter | 4 |
| Consumption of plasma-forming gas (oxygen), nm³/hr. | 4 |
| Arc time when cutting sheet steel, in min. | 1 |
| Off-time between two on-times, min. | 0.5. |

The active insert 2 was made in the form of a cylinder from hafnium wire and placed into a die-formed aluminium socket having a wall thickness of 0.1 mm; then it was inserted into a hole 2.7 mm in diameter in a copper holder blank. The copper holder blank was a cylinder, 16 mm in diameter and 14 mm high with a blind cavity. The finished electrode was obtained by combined die forming. The number of cuts on sheet steel when using the above electrode corresponding to an erosion of 3.5 mm along the height of the active insert amounted to 270.

EXAMPLE 2

An electrode was manufactured and tested in the same way as in Example 1. However, an aluminium spacer was 0.05 mm thick and the number of cuts corresponding to an erosion of 3.5 mm along the height of the active insert amounted to 290.

EXAMPLE 3

An electrode was manufactured and tested in the same way as in Example 1. However, an active insert was produced from hafnium powder by the powder-metallurgy method. The number of cuts corresponding to an erosion of 3.5 mm along the height of the active insert was 280.

EXAMPLE 4

An electrode was manufactured and tested in the same way as in Example 1, but an active insert was produced from a mixture of pulverized hafnium and yttrium by the powder-metallurgy method, with the weight percentage of the above components being hafnium, 92; yttrium oxide, 8. The number of cuts corresponding to an erosion of 3.5 mm along the height of the active insert amounted to 330.

EXAMPLE 5

An electrode was manufactured and tested in the same way as in Example 1, but an active insert was produced from a mixture of pulverized hafnium and yttrium oxide by the powder-metallurgy method, with the weight percentage of the above components being: hafnium, 88; yttrium oxide, 12. The number of cuts corresponding to an erosion of 3.5 mm along the height of the active insert amounted to 320.

EXAMPLE 6

An electrode was manufactured and tested in the same way as in Example 1, but an active insert was produced from a mixture of pulverized hafnium, yttrium oxide and neodymium oxide by the powder-metallurgy method, with the weight percentage of the above components being as follows: hafnium, 91; yttrium oxide, 7.3; neodymium oxide, 1.7. The number of cuts corresponding to an erosion of 3.5 mm along the height of the active insert amounted to 400.

Figure 2:
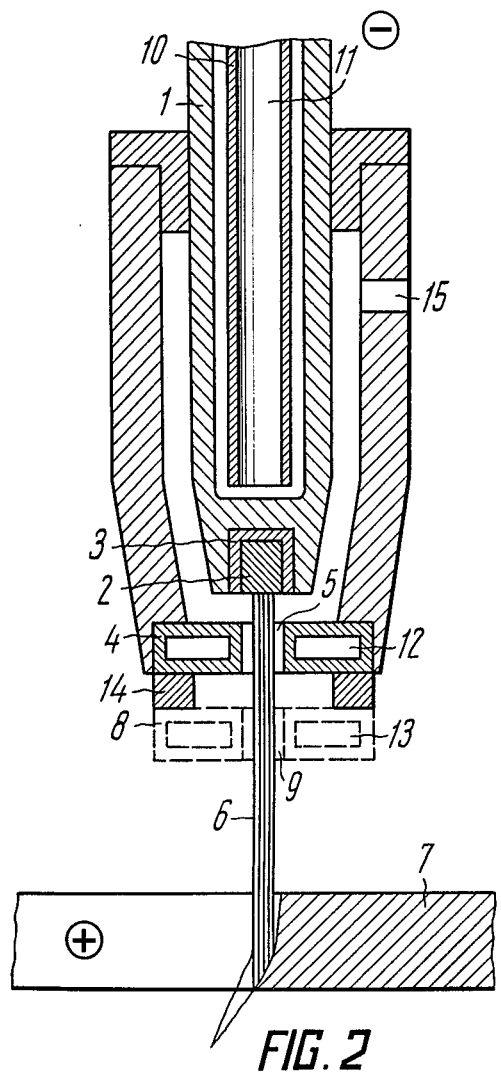
FIG. 2 shows a plasmatron with the nonconsumable electrode, according to the invention.

The herein-proposed nonconsumable electrode may prove to be useful in plasmatrons for plasma arc cutting of articles. Such plasmatron comprises a nonconsumable electrode made from the copper holder 1 (FIG. 2) and the active insert 2 located flush with the holder 1 and which is produced from hafnium or from hafnium with yttrium, or neodymium oxides as dopants, with said active insert being separated from the holder 1 by an aluminum or an alloy thereof metal spacer 3.

A nozzle 4 is alligned axially with the active insert 2 with a central passage 5 being adapted to stabilize an arc 6 arcing between the active insert 2 and a workpiece 7 being machined.

In order to prevent the striking of a double arc when the nozzle 4 comes into contact with the workpiece 7 being machined or in order to increase the total length of the central passage 5 in the nozzle 4, at least one more nozzle 8 (shown with a dotted line in the drawing) with a central passage 9 may be additionally mounted.

The holder 1 is a hollow member and is cooled with a coolant fed along a pipe 10 disposed within cavity 11 of the holder 1, with the nozzles 4 and 8 being cooled by feeding the coolant along passages 12 and 13 provided accordingly in the above nozzles 4 and 8.

In the case where several nozzles are employed, an insulating lining 14 is placed therebetween.

A plasma-forming gas, such as oxygen, is fed through a hole 15 into the space formed by the nonconsumable electrode and nozzle 4.

The plasmatron operates in the following manner:

The nonconsumable electrode of the plasmatron is connected to the negative pole of a power supply source (not shown in the drawing), whose positive pole is coupled to the workpiece 7 being machined. A coolant is fed into the cavity 11 of the holder 1 along the pipe 10 and into the nozzles 4 and 8 along the passages 12 and 13. At the same time a plasma-forming gas, such as oxygen, is passed through the hole 15 and into the central passages 5 and 9 so to strike an arc between the active insert 2 of the nonconsumable electrode and the workpiece 7 being machined. With the plasmatron operating in oxygen the service life of the nonconsumable electrode will extend along the entire height of the active insert 2, because the aluminum oxides formed on the metal distance piece 3 are of a high-melting compound then act as a thermal shield protecting the holder 1 from both overheating and oxidation, whereas the active insert 2 made from hafnium with yttrium oxide as a dopant which will extend the service life of the nonconsumable electrode, for in an arc sustained in oxygen, yttrium oxide stabilizes the hafnium oxides formed on the emitting surface thus and enhances their thermostability.

What we claim is:

1. A nonconsumable electrode for oxygen arc working, comprising: a holder made from a metal selected from the group consisting of copper and alloys thereof; an active insert fastened to the end face of said holder and produced from a metal selected from the group consisting of hafnium, and hafnium in combination with dopants selected from the group consisting of yttrium oxide; neodymium oxide, and a combination of yttrium and neodymium oxides; a metal spacer disposed between said holder and said active insert extending over the entire contact surface area thereof so that said active insert is in thermal and electric contact with said holder through said metal spacer; and with said metal spacer being a metal selected from the group consisting of aluminium and alloys thereof.

2. The nonconsumable electrode of claim 1, wherein the thickness of the metal spacer produced from aluminium or alloys thereof, is from 0.01 to 0.2 mm.

3. The nonconsumable electrode of claim 1, wherein the active insert is made from hafnium with yttrium oxide as a dopant, with the weight percentage of the components being:

| | |
|---|---|
| hafnium, | 94–86; |
| yttrium oxide, | 6–14. |

4. The nonconsumable electrode of claim 1, wherein the active insert is manufactured from hafnium with yttrium and neodymium oxides as dopants, with the weight percentage of the components being:

| | |
|---|---|
| hafnium, | 93–89; |
| yttrium oxide, | 6–9; |
| neodymium oxide, | 1–2. |

* * * * *